United States Patent [19]

Gay et al.

[11] Patent Number: 5,535,320
[45] Date of Patent: Jul. 9, 1996

[54] METHOD OF GENERATING A VISUAL DESIGN

[76] Inventors: Clive H. Gay, Riverside Three, Albert Wharf, Hester Road, Battersea, London, SW11 4AN, England; Henri W. Frencken, 26 The Farthings, Brunswick Road, Kingston-Upon-Thames, London, England

[21] Appl. No.: 268,613

[22] Filed: Jul. 1, 1994

[30] Foreign Application Priority Data

Jul. 2, 1993 [GB] United Kingdom .................. 9313761

[51] Int. Cl.⁶ .................................................. G06F 15/62
[52] U.S. Cl. ............................................................ 395/150
[58] Field of Search ..................................... 395/133, 141, 395/142, 150, 151; 345/24, 25, 143

[56] References Cited

U.S. PATENT DOCUMENTS 5,337,407  8/1994  Bates et al. ............................. 395/153

OTHER PUBLICATIONS

"A Practical Application of a Computer to Industrial Design" Computer Graphics Tokyo '84. Proceedings 24; Apr. 1984, Japan; pp. T4-1—1-14; Hatakenaka et al.

"Structures of an Integrated Document Workstation" Computer & Graphics; vol. 11, No. 4, 1987, UK; pp. 377–387 XP115887; Gruber.

Primary Examiner—Phu K. Nguyen
Attorney, Agent, or Firm—Sterne, Kessler, Goldstein & Fox

[57] ABSTRACT

The invention relates to a method of generating a representation of a visual design. The visual design could be applied to advertising material, signage, letterheads or packaging, for example, where it is important to maintain a consistent identity from one application to the next. The method includes storing data defining a number of visual design elements such as logos, graphics or other images, as well as text elements including predetermined words and phrases. Predetermined design parameters for different design applications are also stored. These parameters, together with user-entered variables within a permitted range adjust the relative size of each element and the juxtaposition of the elements in the final design. The result is designs which are consistent in the impression which they create to a viewer, even when applied to widely differing articles. The finished visual design may be displayed on a screen for viewing, and will then be printed in a hard-copy form as final artwork.

20 Claims, 21 Drawing Sheets

FLOW 3 VIEW

FLOW 4 APPLICATIONS

METHOD OF GENERATING A VISUAL DESIGN

BACKGROUND OF THE INVENTION

This invention relates to a method of generating a visual design for application, for example, in the field of advertising, packaging or creating corporate images.

When visual design elements such as logos, logotypes or graphics and test elements relating to a corporate identity or product range are used in various different applications, it can become extremely difficult to maintain a consistent identity. For example, a particular trade mark may be applied to a number of different products, with a number of different forms of packaging, as well as being applied in advertising, signage, and on letterheads. This can result in confusion and dilution of the company's corporate identify and the product's image. In order to counteract this, a great amount of effort may be expended by designers in attempting to maintain a consistent image over a wide range of visual design applications. This greatly increases the costs and time involved in such a design process.

SUMMARY OF THE INVENTION

According to the invention a method of generating a representation of a visual design comprises:
storing data defining a plurality of visual design elements;
storing data defining a plurality of predetermined design parameters;
selecting one of a plurality of predetermined visual design applications, each having one or more predetermined design parameters associated with it;
selecting at least one visual design element for inclusion in the visual design;
generating a visual design utilising the selected visual design element, the size and position of the element in the visual design being determined by the predetermined design parameters associated with the selected design application; and
generating a representation of the visual design.

The method may include storing data defining a plurality of test elements, and generating the visual design utilising at least one selected visual design element and at least one selected text element, the relative size of each element and the juxtaposition of the elements being determined by the stored data relating to the predetermined design parameters.

The predetermined design parameters may include an intended viewing distance for the visual design, and the relative size and spacing of respective visual design elements and test elements, both with respect to one another and to predetermined positions in the visual design.

The method may include entering data corresponding to a permitted range of variables in the selected design application, and adjusting the size and/or position of the selected elements in response to the entered data.

The entered data preferably includes the intended viewing distance or the relative size and spacing of respective visual design elements and test elements both with respect to one another and to predetermined positions in the visual design.

The representation may comprise final artwork, reproduction material or specification drawings.

The visual design elements may include logos, logotypes, graphics or other images, and wording in predetermined fonts.

The test elements may include predetermined words, phrases and blocks of text.

The predetermined visual design applications may include stationery, livery, signage, packaging, promotions and advertising applications.

Preferably, each of the plurality of predetermined visual design applications has its own predetermined design parameters, which are related to the predetermined design parameters of one or more of the other visual design applications.

The method may include generating a display of the visual design on a video display unit or another display for viewing.

Preferably, the method includes storing a plurality of artwork elements, and reducing the visual design to a suitable hard-copy form, by relating the visual design to the stored artwork elements, thereby to generate artwork corresponding to the visual design.

The artwork may be generated in the form of a printed image or be stored on a computer disc.

DESCRIPTION OF AN EMBODIMENT

Figure 1:
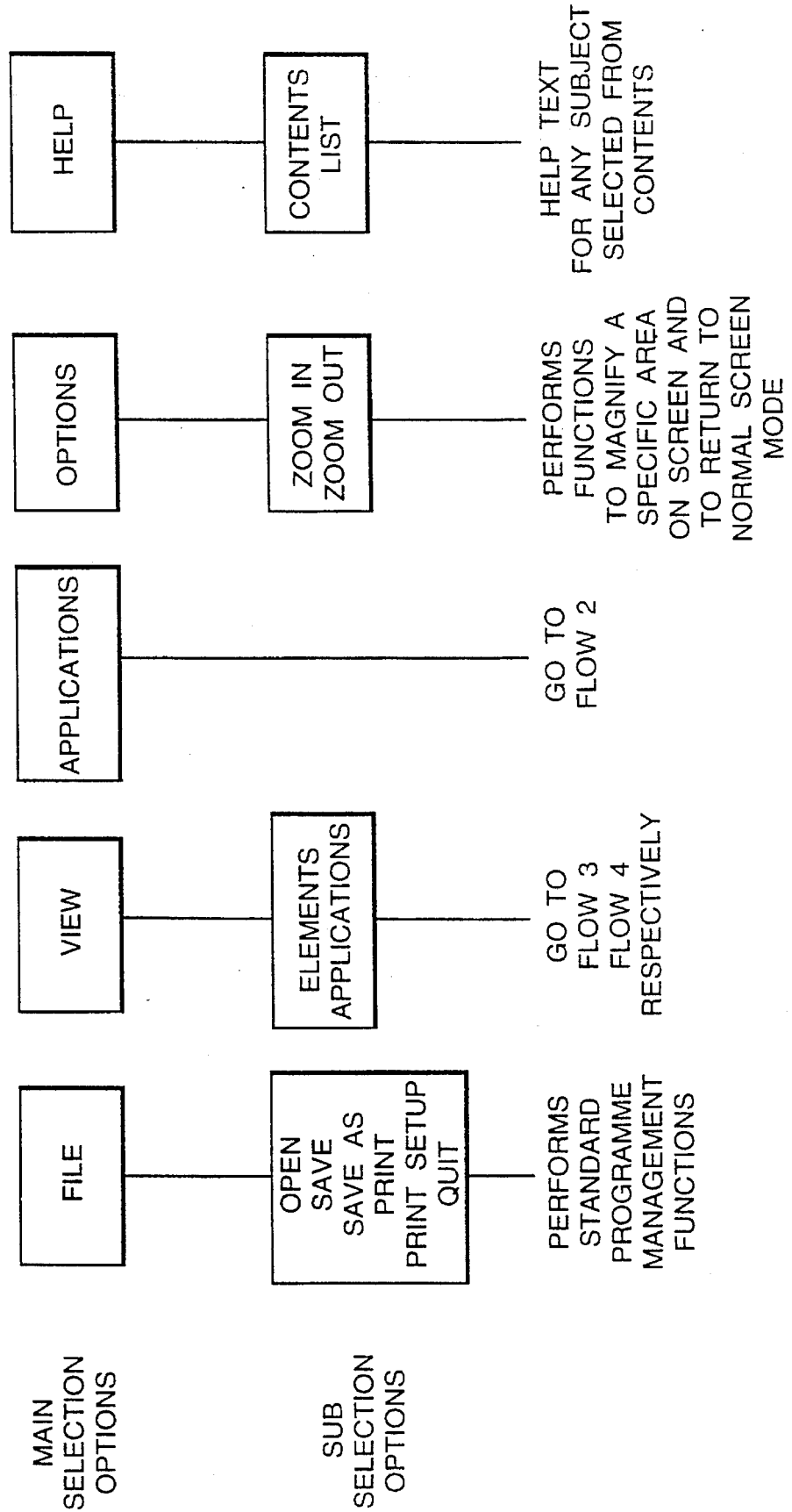
FIG. 1 is a diagram illustrating a first menu structure of computer software for implementing the method of the invention.

The present invention finds application in the generation of artwork for applying a corporate image, packaging, signs and so on. The method is implemented using specially written computer software, which is customised for different visual design applications.

In order to produce the required software, it is necessary to identify the required visual design elements and text elements which will be used in preparing the required visual designs. The visual design elements will typically include logos, logotypes, graphics or other images, icons and custom wording in predetermined fonts. These visual design elements are stored in a first database. The required text elements will typically include predetermined words, phrases, and blocks of text which may be descriptive or promotional in nature. The text elements are stored in a second database.

A third database stores data relating to predetermined design parameters which vary according to the visual design application which is selected. Possible visual design applications include stationery, livery, signage, environmental items or structures, interior and exterior design, packaging, promotions and advertising, each of which sets somewhat different requirements for the appearance of the visual design to be generated. The third database stores data which determines the appearance of the final visual design, taking into account the intended viewing distance for the visual design, the relative spacing between and the relative sizes of both the visual design elements and the text elements which form part of the visual design, as well as their juxtaposition within the field of the design and the positioning of each element relative to predetermined positions in the visual design.

For example, a primary visual design element, such as a trademark logotype identifying a product, may be positioned in the top left hand corner of a rectangular space, and is sized so that its height and width are predetermined proportions of the height and width of the overall design area. The exact positioning of the logotype relative to the edges of the design space and to other visual or test elements in the design is also predetermined. These relationships are stored in the form of mathematical formulae, which are calculated from original visual designs which are used as the starting point for the software.

The effect of this is that visual designs which are used to identify a particular product, service or company, for example, have a consistent visual effect irrespective of different applications thereof. For example, when the predetermined design parameters are calculated, different priorities may be assigned to criteria such as readability. Thus, in the case of a visual design which is intended for application on a billboard or on the side of a vehicle, the size of the text elements forming part of the design may be increased relative to other elements of the design, without departing from the overall visual effect of other related designs for different applications.

Figure 2:
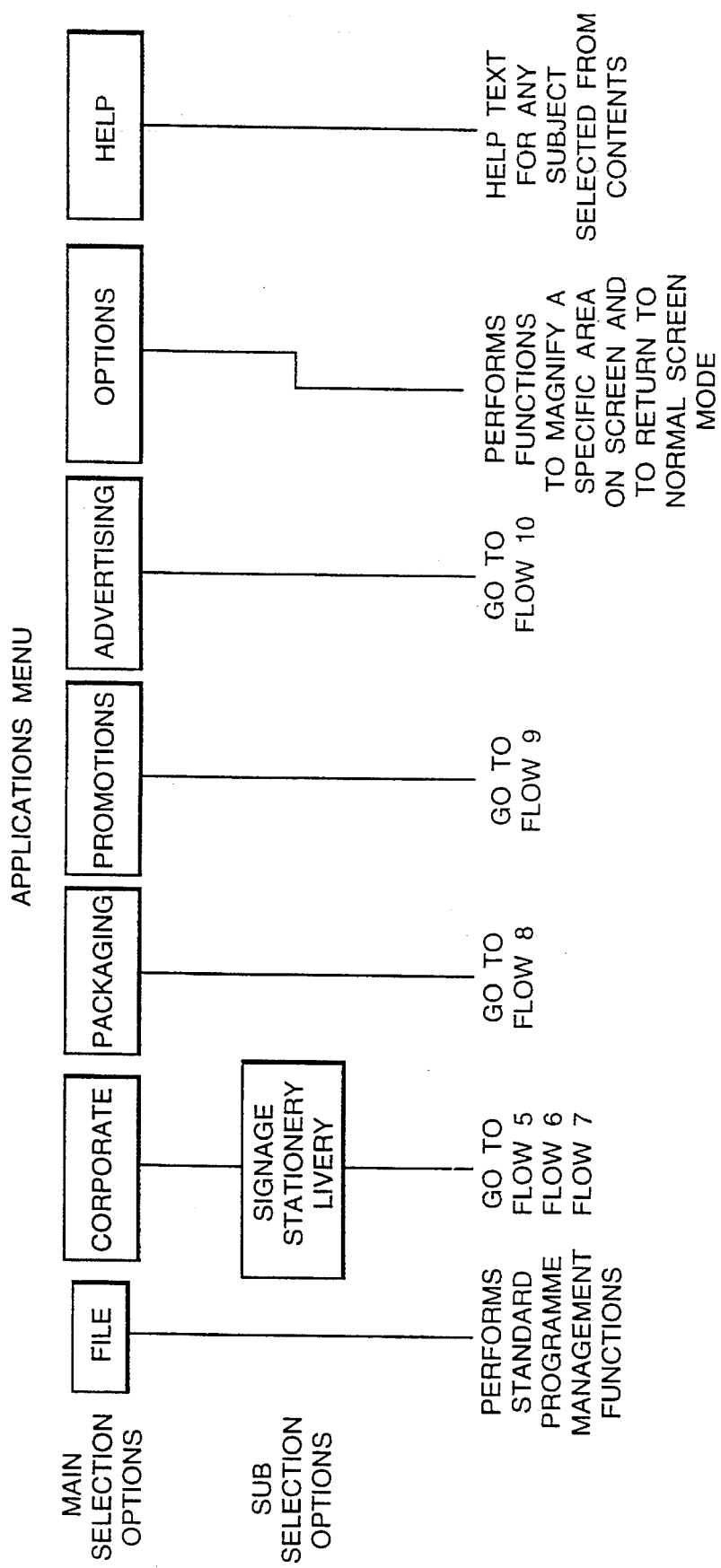
FIG. 2 is a diagram illustrating a second menu of the software.
Figure 3:
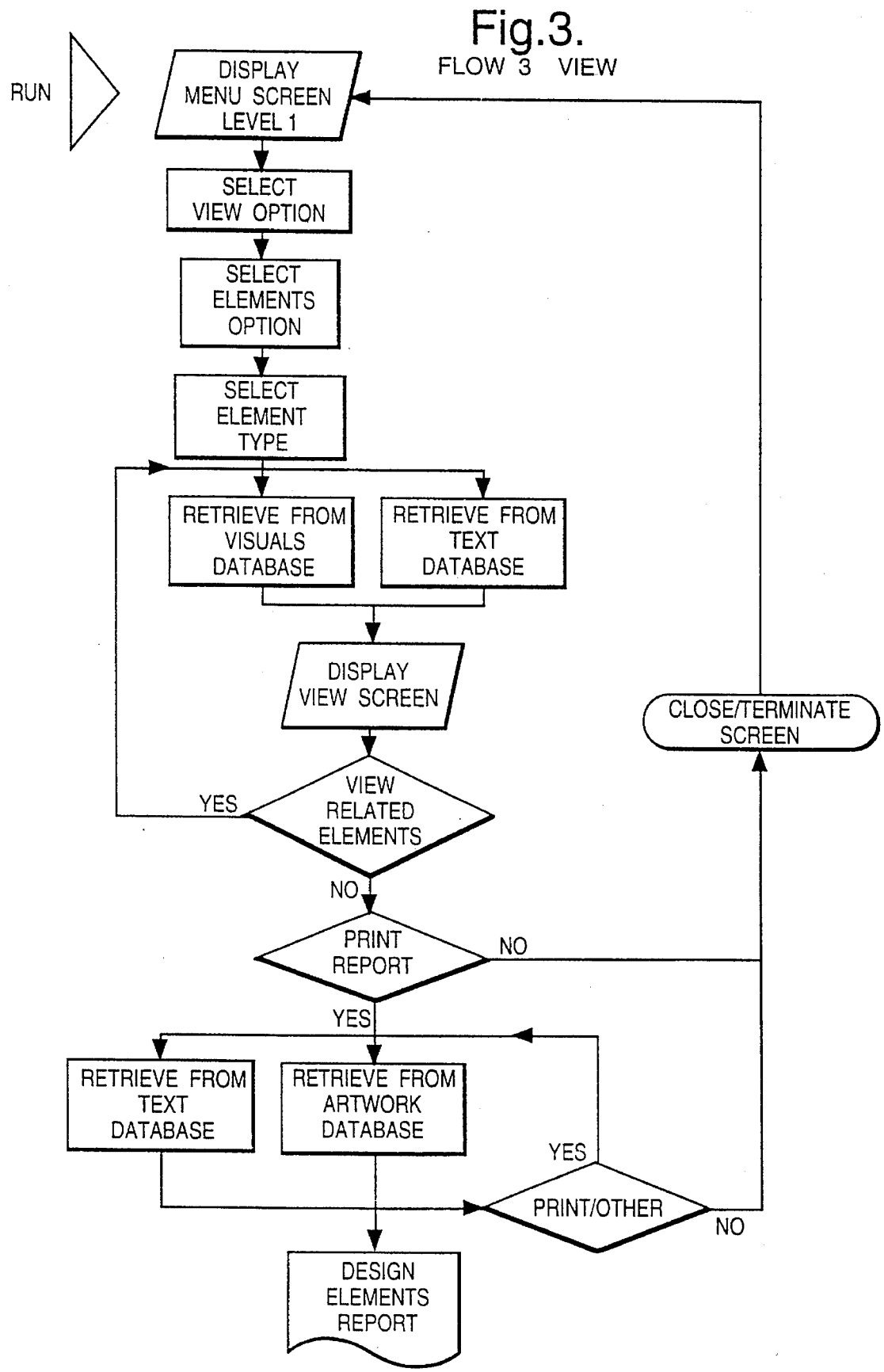
FIGS. 3 and 4 are flow charts corresponding to the menus of FIGS. 1 and 2, respectively.
Figure 4:
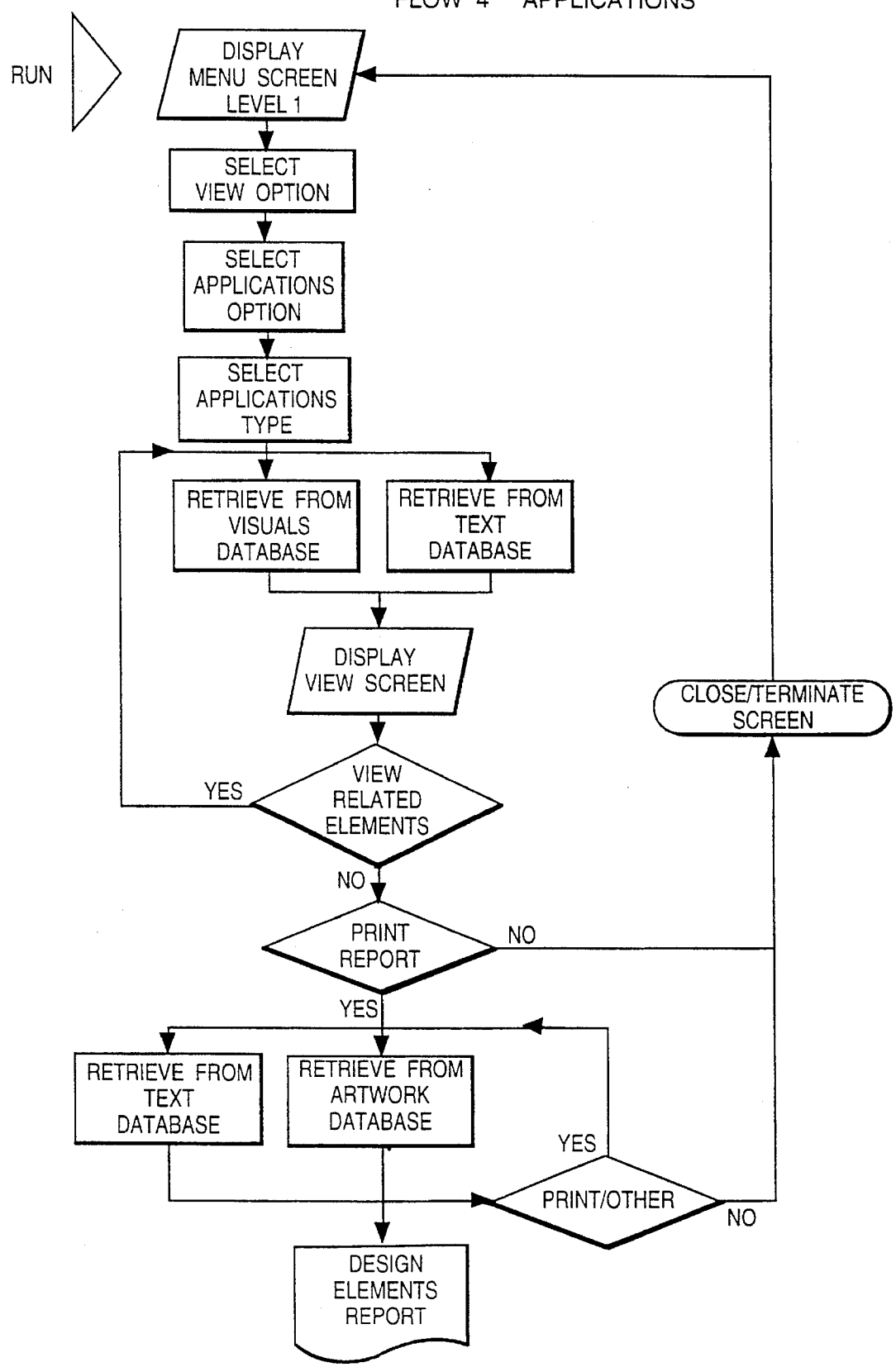

FIGS. 1 and 2 of the drawings show two primary menus of the software for implementing the method of the invention. These menus relate to a "view" function which is used to view the individual design elements which apply to a particular product or company, and to view examples of visual designs. The second menu relates to an "applications" function which is used to actually generate a visual design. The flow charts of FIGS. 3 and 4 correspond to the menus of FIGS. 1 and 2, and are largely self-explanatory.

Figure 5:
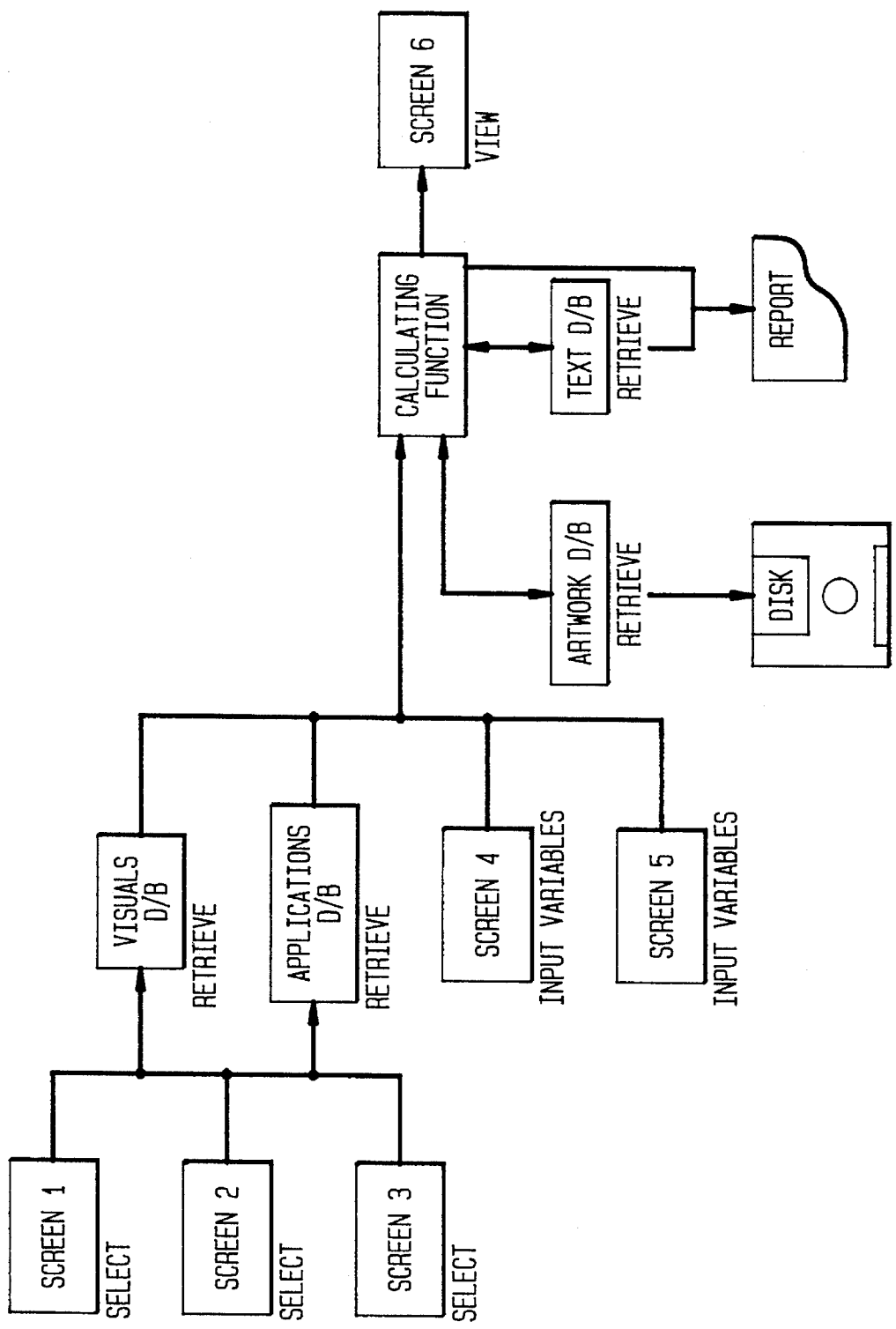
FIG. 5 is a simplified overall flow diagram, illustrating the operation of the software.
Figure 6A:
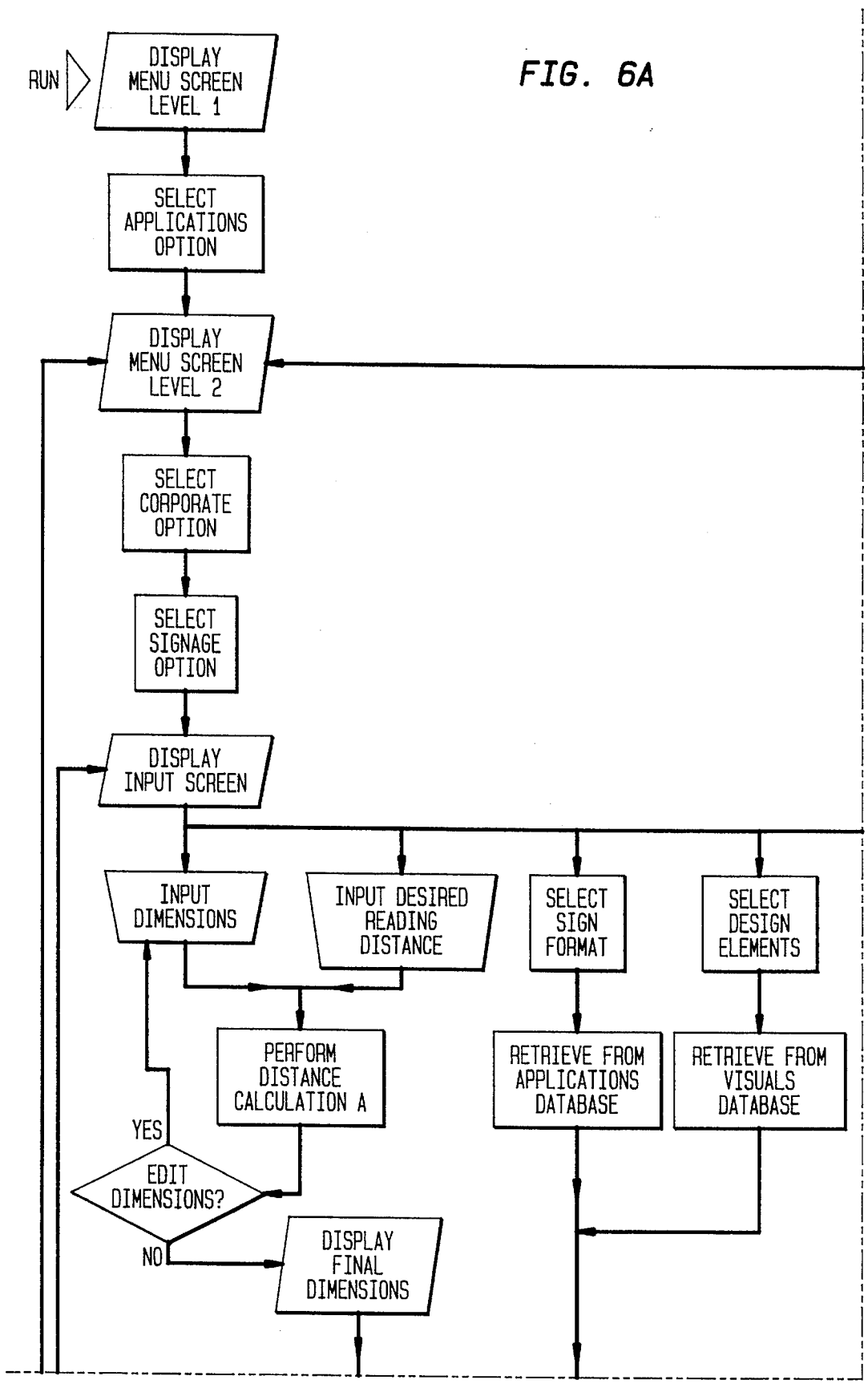
FIGS. 6A to 11B are flow charts illustrating the operation of the software for a number of different design applications.
Figure 6B:
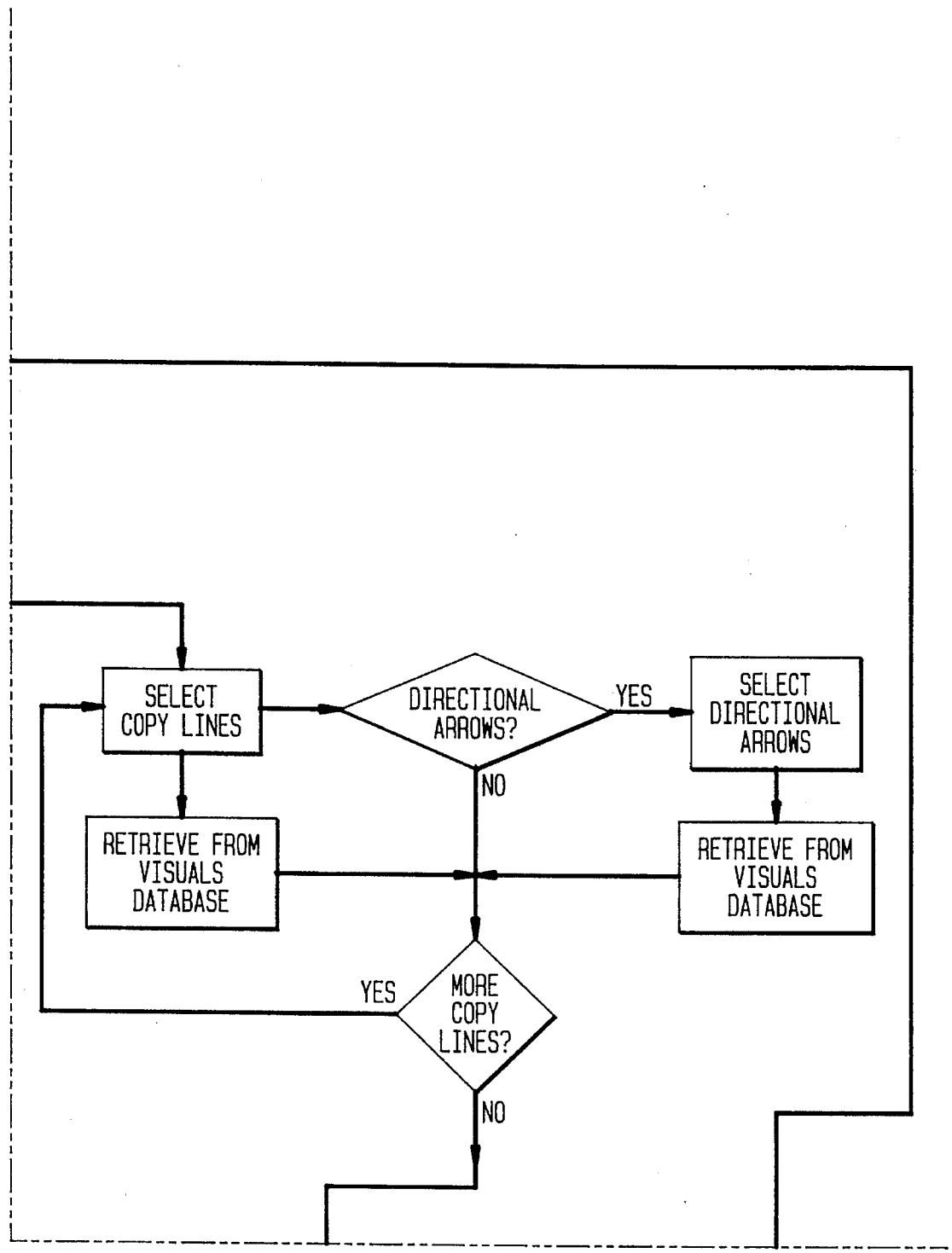
Figure 6C:
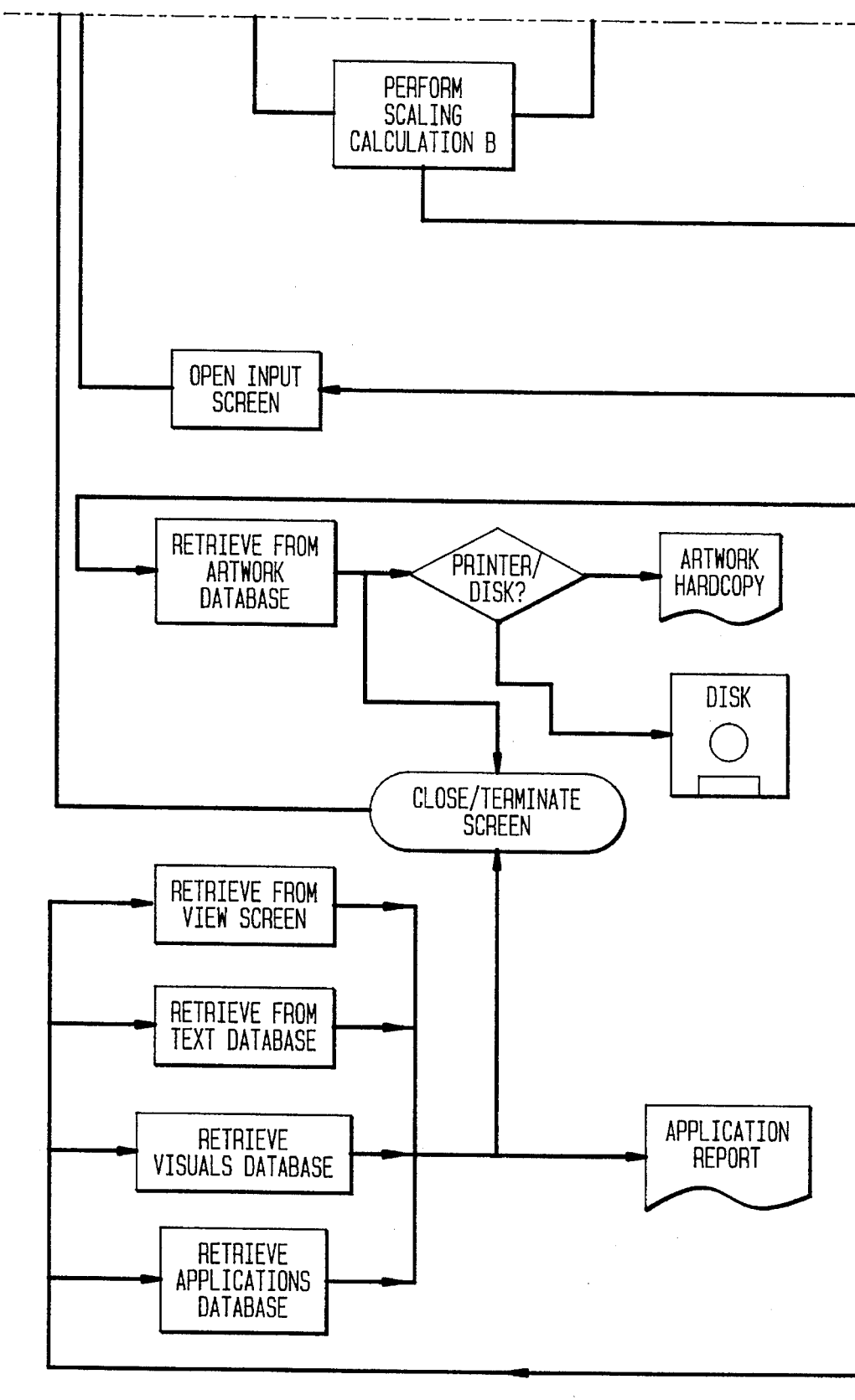
Figure 6D:
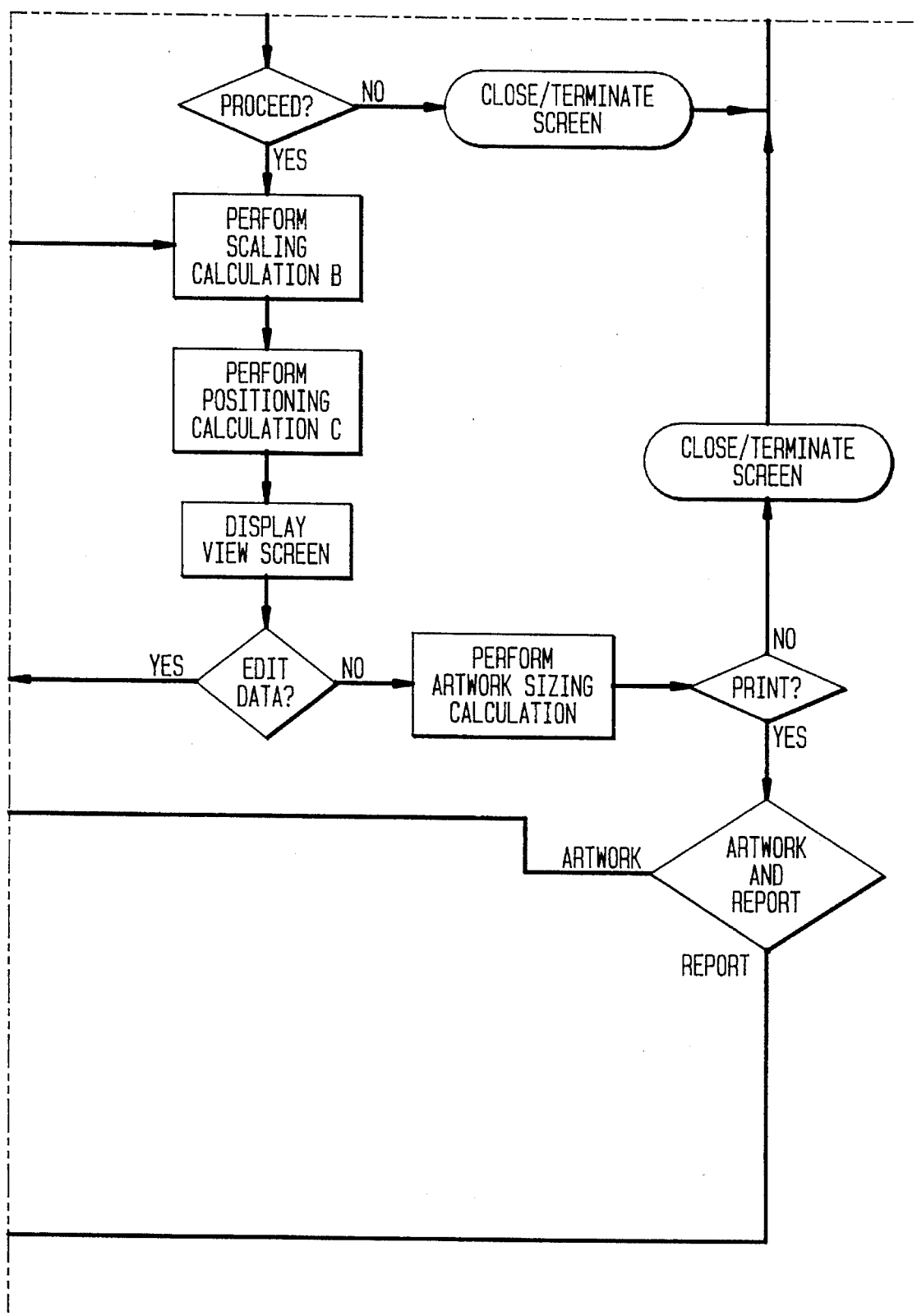
Figure 7A:
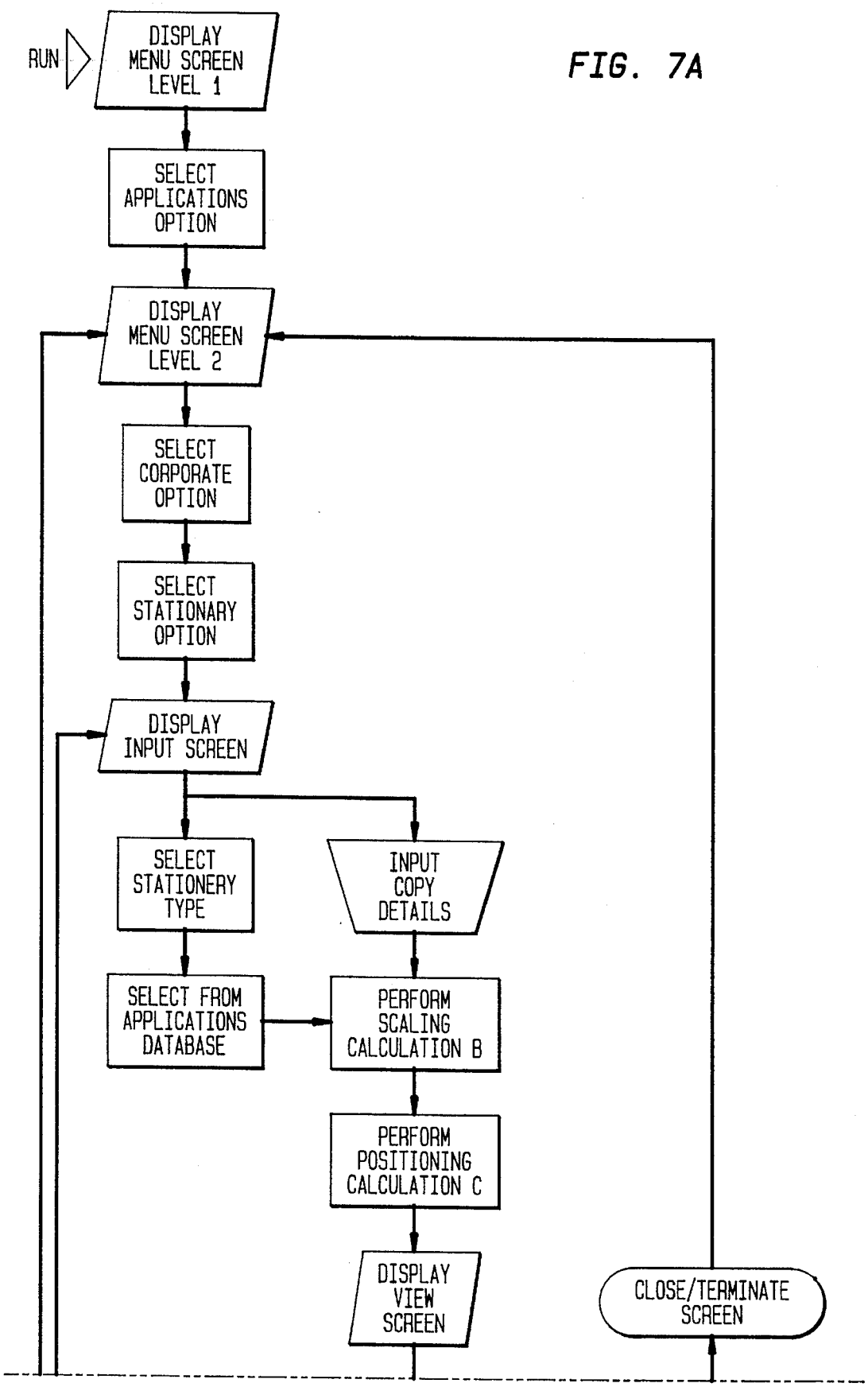
Figure 7B:
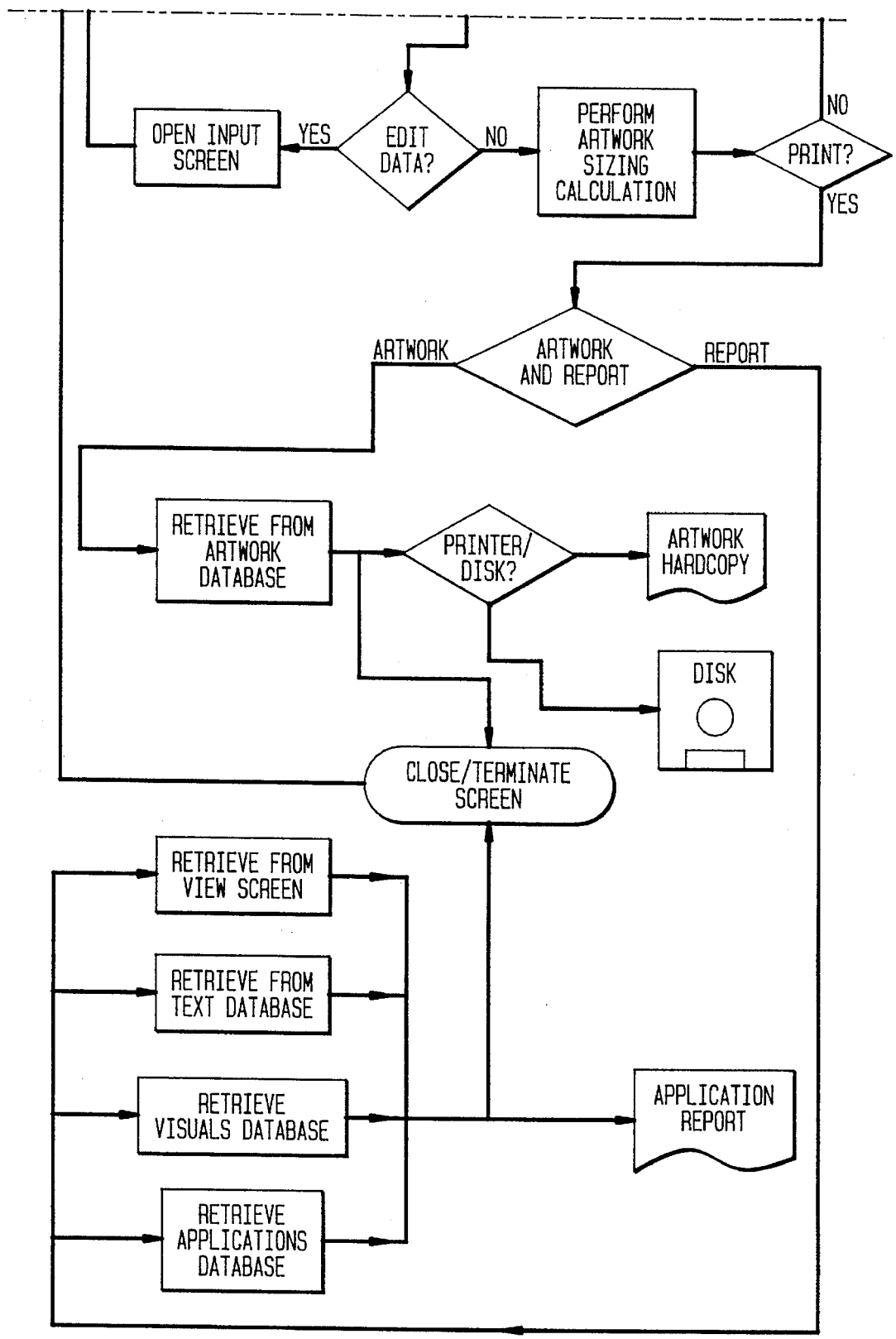
Figure 8A:
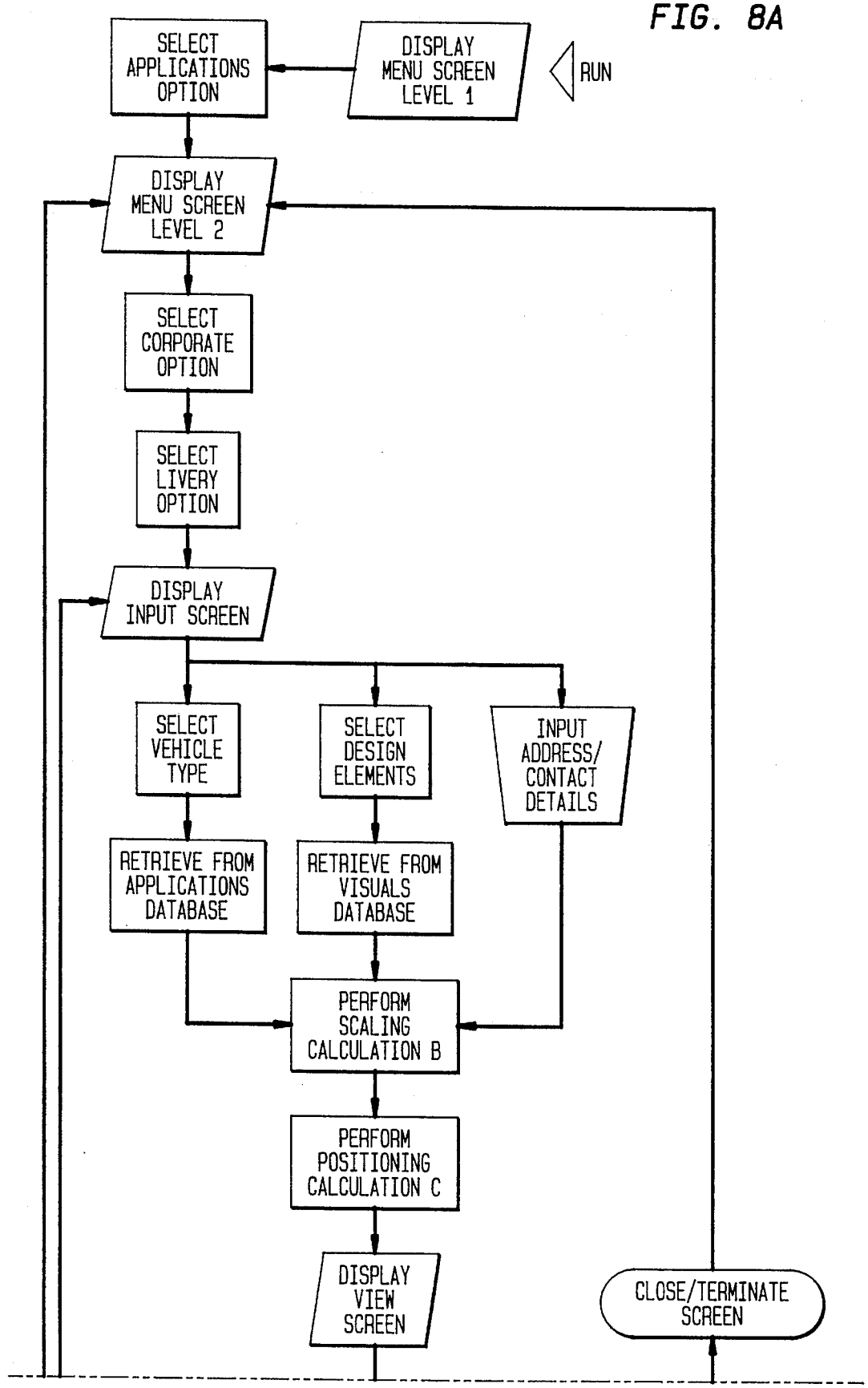
Figure 8B:
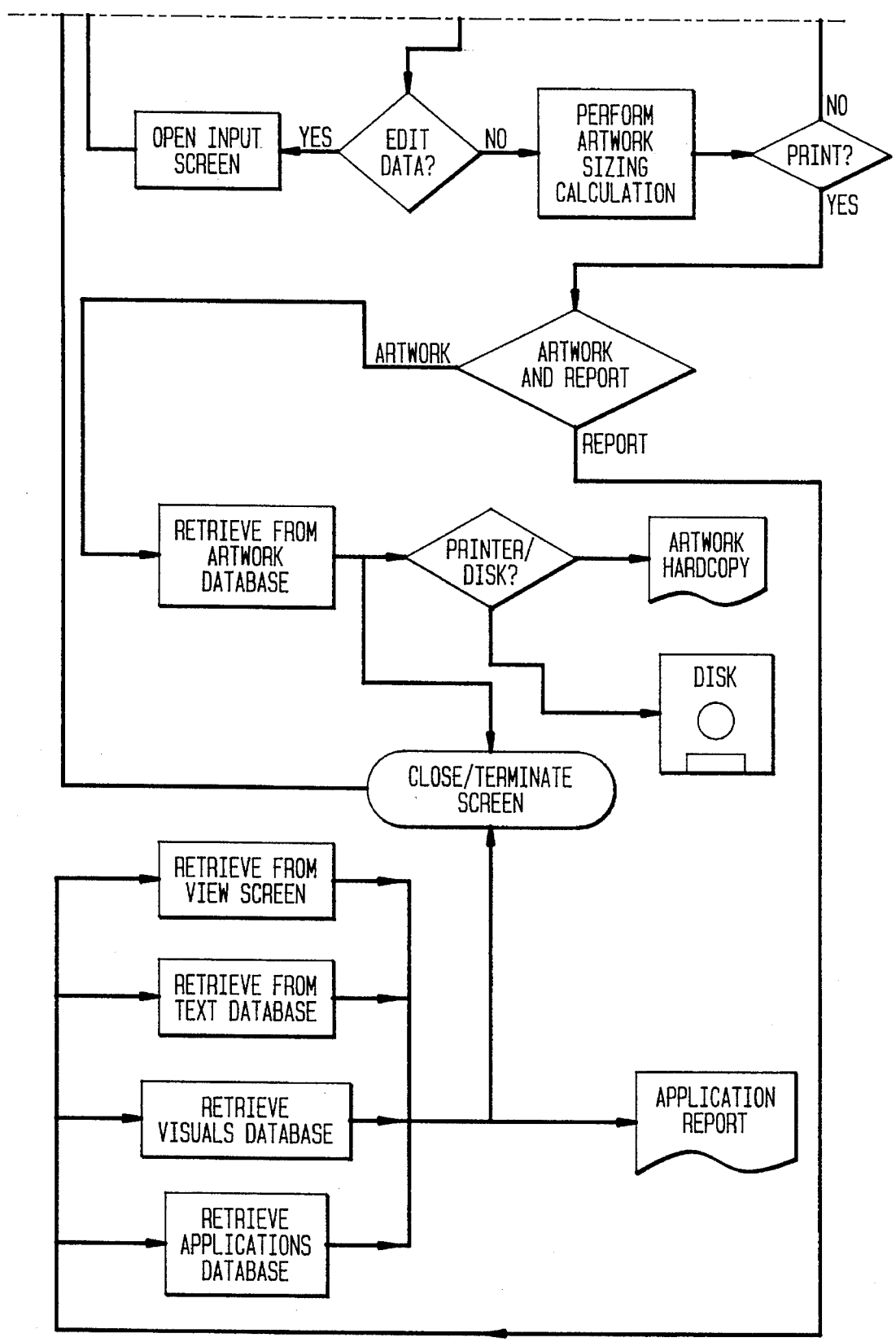
Figure 9A:
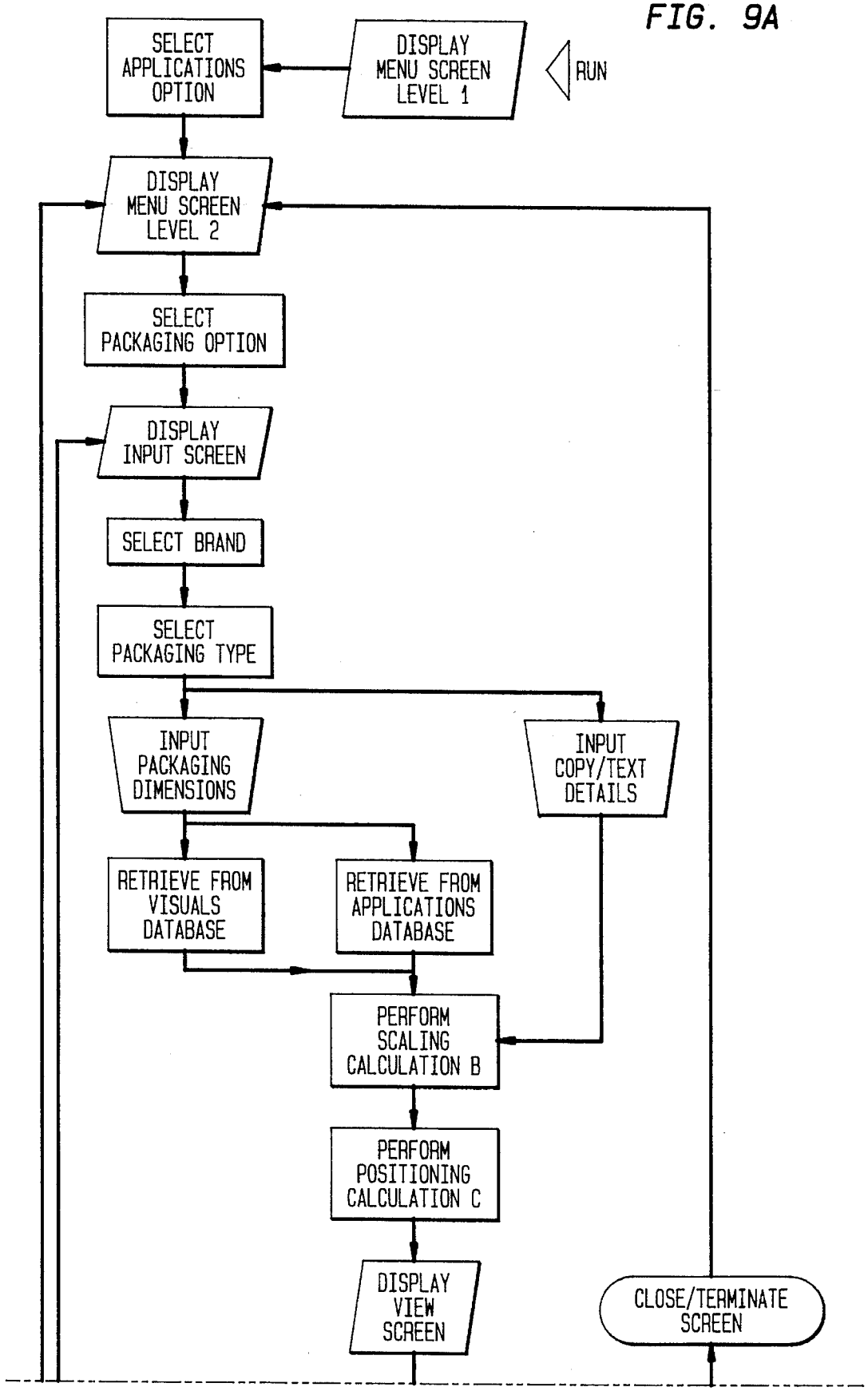
Figure 9B:
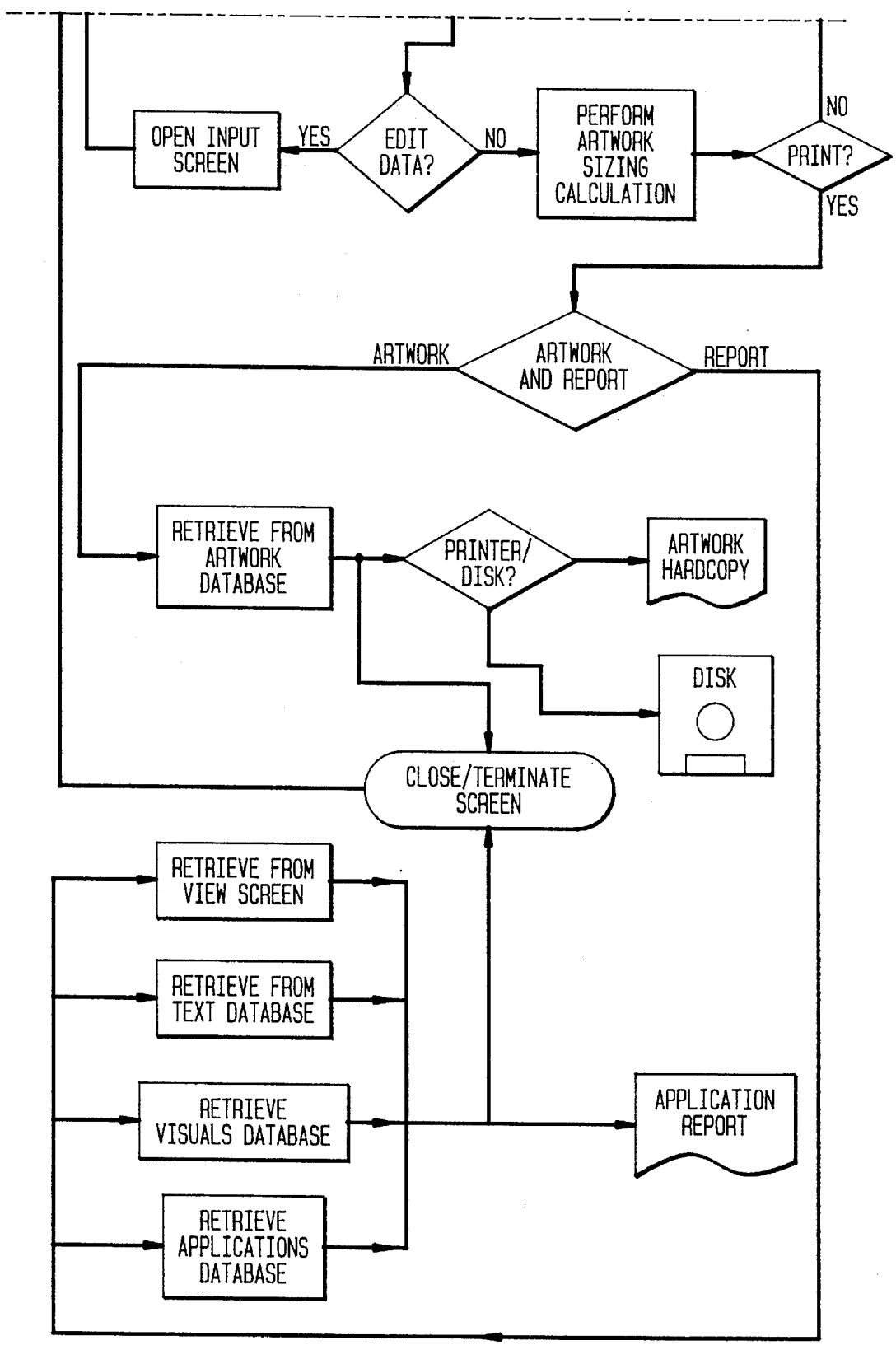
Figure 10A:
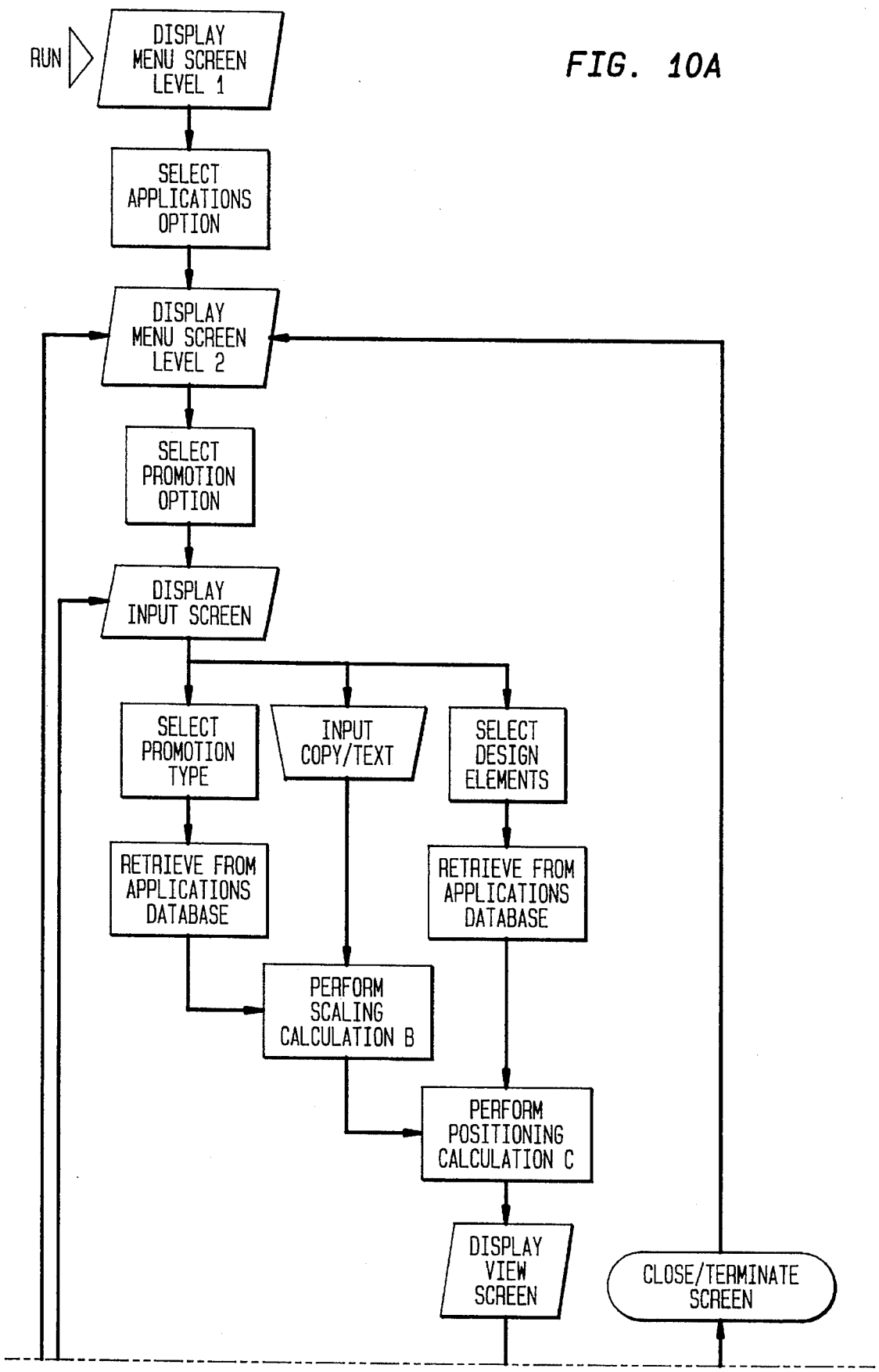
Figure 10B:
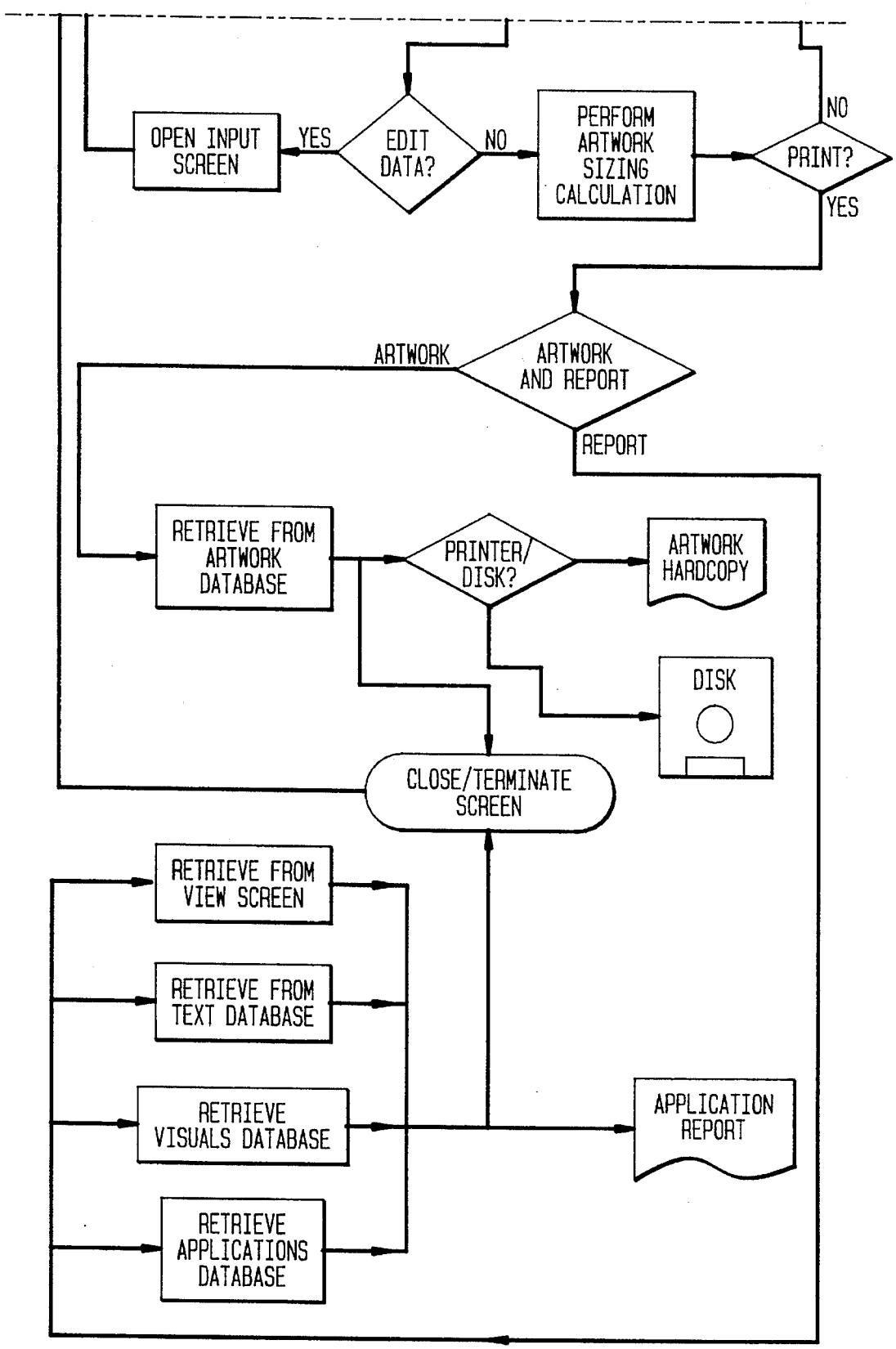
Figure 11A:
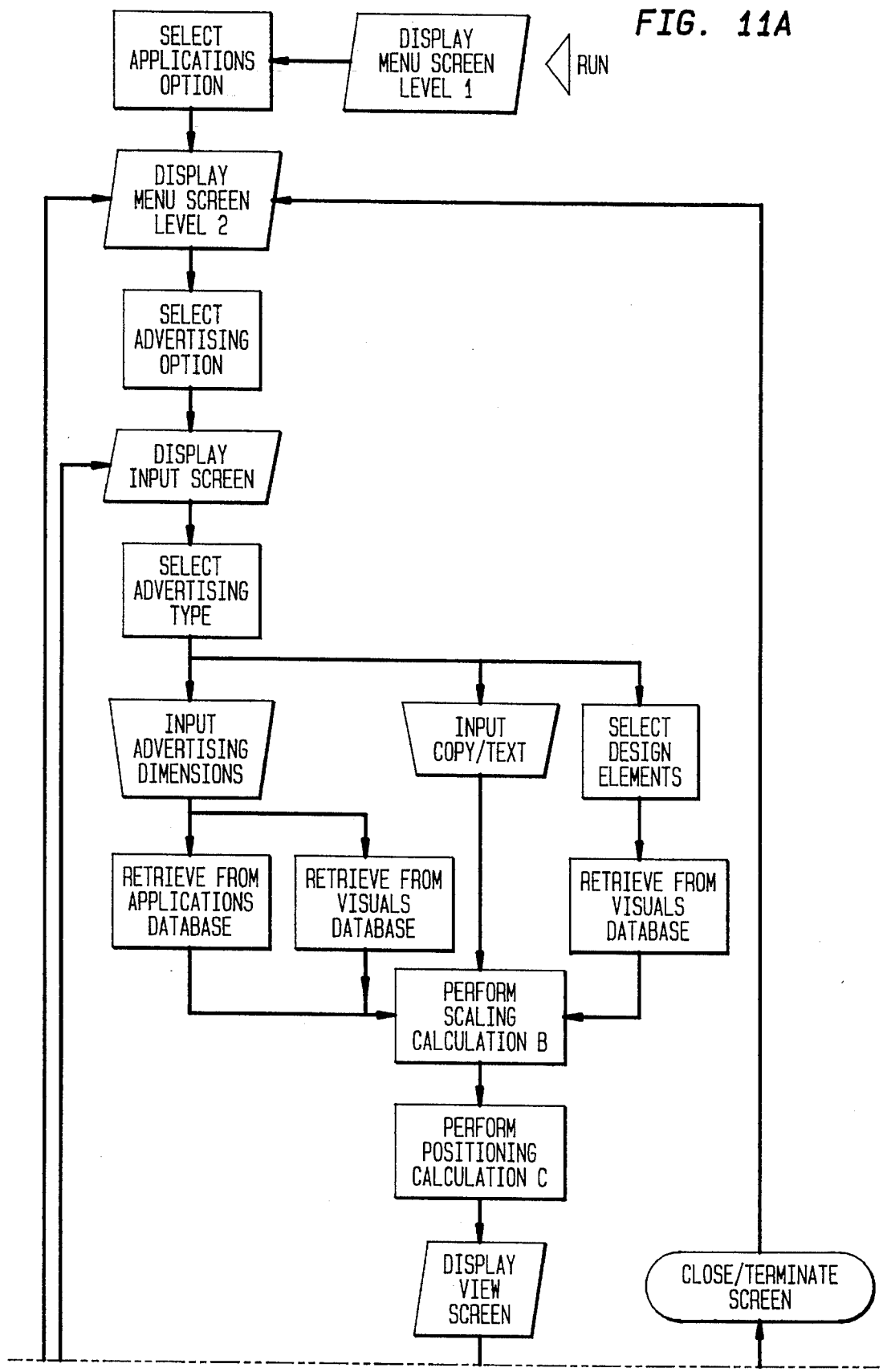
Figure 11B:
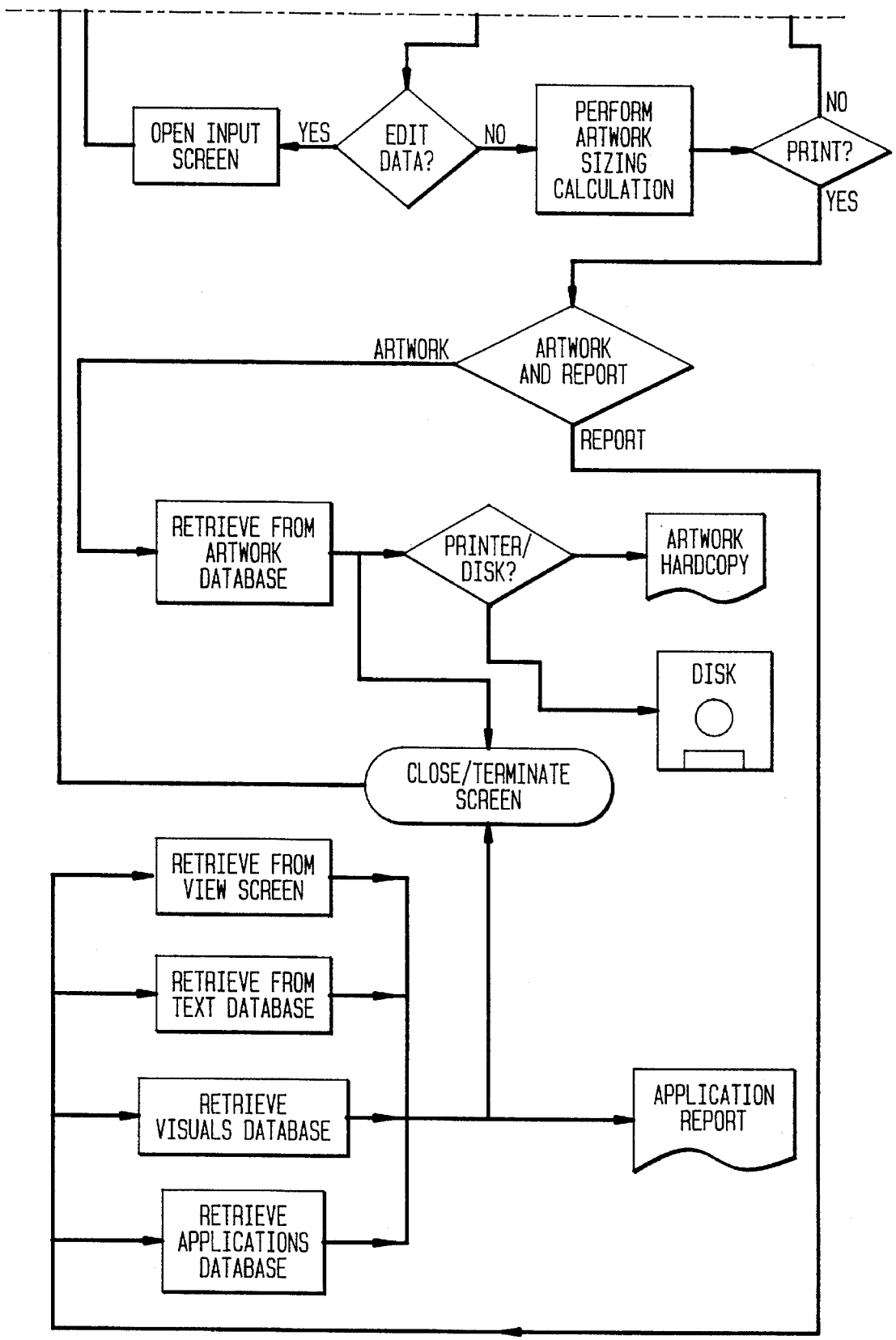

FIG. 5 illustrates, in a highly simplified form, the overall functioning of the software. The software includes a "visuals" database which stores the various visual design elements or graphics which can be used in generating a visual design, the test database which stores the respective text elements, the applications database which stores the data relating to the predetermined design parameters, and an artwork database which stores artwork of all the individual design elements, constructed to the accuracy needed for reproduction. They visuals database is used by the software both to display the various visual design elements on a video monitor or another display, and also to print reports. The text database is used to display and print the text indicating the design control parameters relevant to the selected visual design elements and the selected applications.

The flow diagrams of FIGS. 6A to 11B refer to four basic kinds of calculation which are performed using the data stored in the applications database. These are referred to as calculation A: Reading distance; calculation B: Scaling calculation; calculation C: Positioning calculation; and calculation D: Artwork sizing calculation.

When a user of the software inputs the design dimensions of the visual design to be generated, the software will calculate the appropriate reading distance for the resulting visual design. Alternatively, the user may elect to input a desired reading distance, in which case the calculation will determine the overall dimensions required for the visual design.

Based on the desired dimensions input by the user and after retrieval from the visuals database of the selected visual design elements, the scaling calculation will scale the sizes of the visual design elements according to predetermined ratios which are calculated when setting up the design controls for an identity.

Based on the selected input dimensions and on the selected visual design elements, which have been scaled by the scaling calculation, the positioning calculation positions the scaled visual design elements and text elements according to predetermined co-ordinates. Again, these co-ordinates are worked out when setting up the design controls for an identity.

The artwork sizing calculation uses the information from calculations B, the scaling calculation, to size standard artwork of the visual and text design elements in order to provide final artwork for reproduction.

The difference between calculation B and calculation D is that the former retrieves visual design elements for graphics from the visuals database of the software for display and print purposes only. Whereas calculation D retrieves corresponding visual design elements or graphics from the artwork database, and by using linked graphic artwork software can accurately scale an output artwork containing those visual design elements or graphic images.

This accuracy is necessary for reproduction purposes. However, when carrying out the designing operation on screen, the use of such linked software would slow down operations unduly. For this reason, the supplementary visuals database is provided, obviating the need to retrieve visual design elements or graphics via linked software, and enabling speedier operation.

Figure 12:
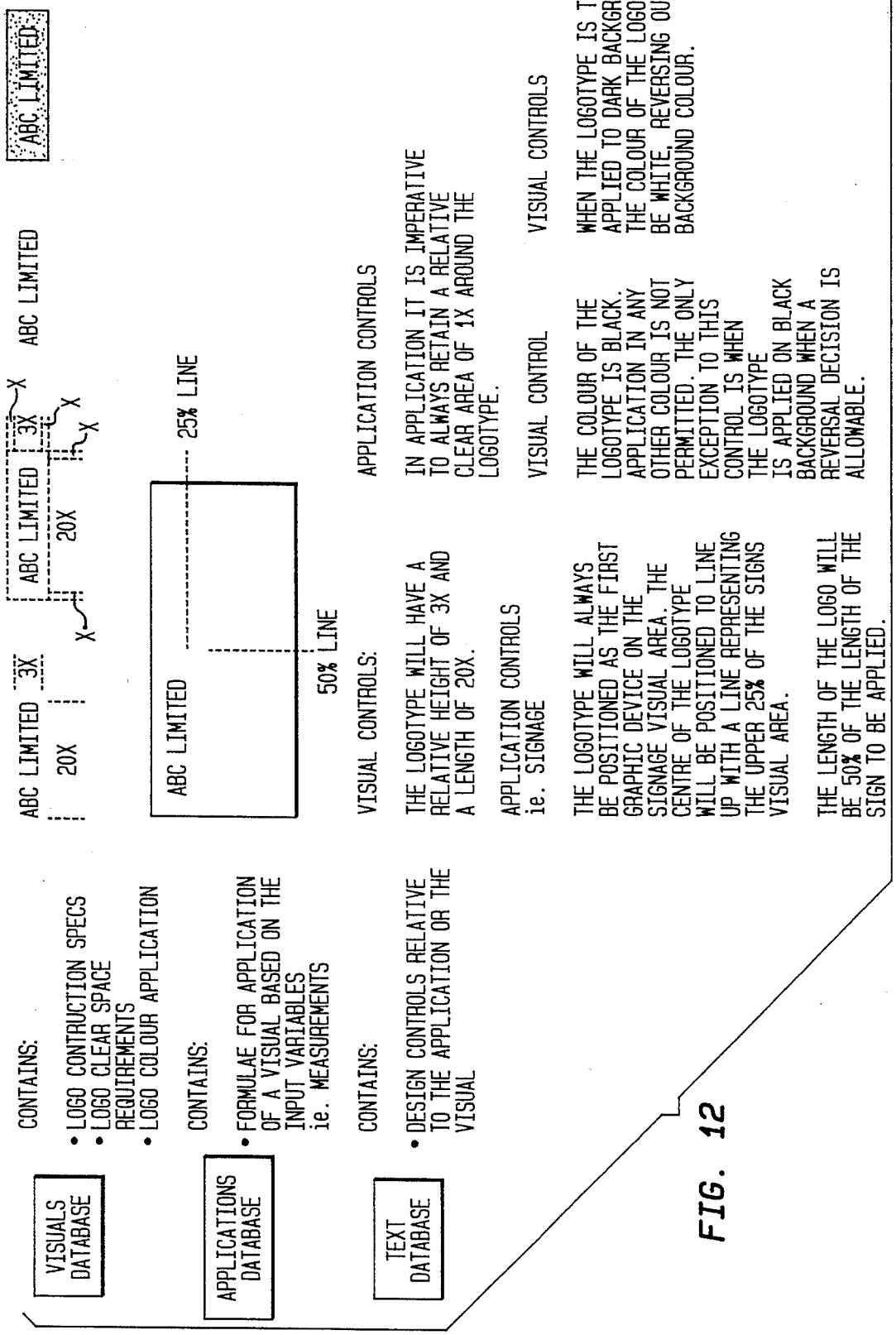
FIG. 12 illustrates the typical contents of databases within the software.
Figure 13:
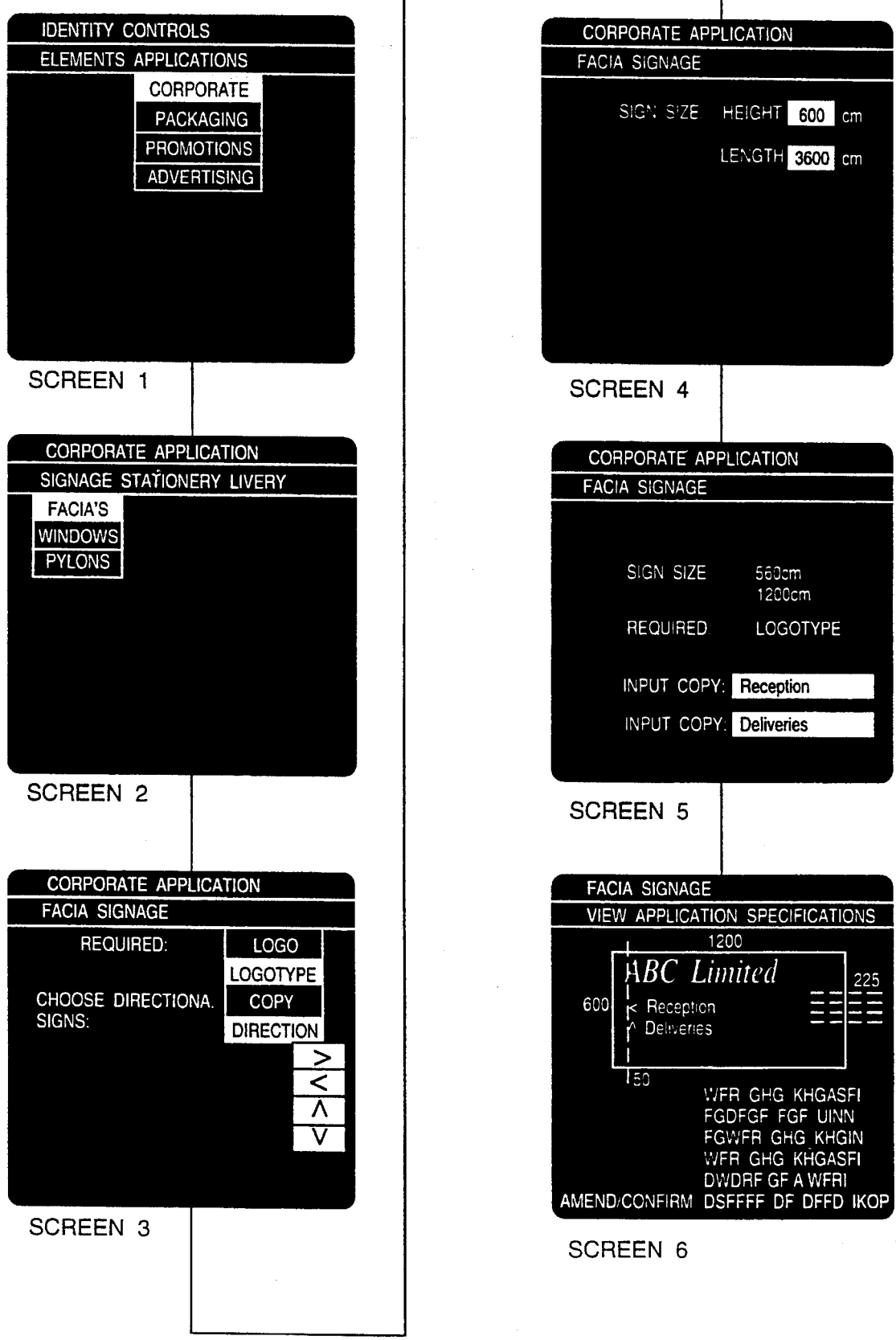
FIG. 13 shows several sample display screens, illustrating the operation of the software in use.

FIGS. 12 and 13 illustrate the operation of the software in use, relating to a fictitious company "ABC Limited". FIG. 12 indicates the information stored in the various databases which is relevant to the generation of a particular design, while FIG. 13 shows the different screens which are displayed during the design operation.

The effect of the described system is to automate the complex inter-relationship between various visual design applications, ensuring consistency of identity from one application to the other, while at the same time providing high quality artwork for reproduction.

We claim:

1. A method of generating a representation of a visual design comprising:

storing data defining a plurality of visual design elements;

storing data defining a plurality of predetermined design parameters;

selecting one of a plurality of predetermined visual design applications, wherein each one of said plurality of predetermined visual design applications is associated with one or more of said plurality of predetermined design parameters;

selecting at least one visual design element for inclusion in the visual design;

generating a visual design utilizing the selected visual design element, the size and position of the element in the visual design being determined by the predetermined design parameters associated with the selected design application; and generating a representation of the visual design.

2. A method for generating a representation of a visual design according to claim 1 including storing data defining a plurality of text elements, and generating the visual design utilizing at least one selected visual design element and at least one selected text element, the relative size of each element and the juxtapostion of the elements being determined by the stored data relating to 3. A method for generating a representation of a visual design according to claim 2 wherein the predetermined design parameters include an intended viewing distance for the visual design, and the relative size and spacing of respective visual design elements and text elements, both with respect to one another and to predetermined positions in the visual design.

4. A method for generating a representation of a visual design according to claim 2 including entering data corresponding to a permitted range of variables in the selected design application, and adjusting at least one of the size and position of the selected elements in response to the entered data.

5. A method for generating a representation of a visual design according to claim 4 wherein the entered data corresponding to the permitted range of variables in the selected design application includes the intended viewing distance or the relative size and spacing of respective visual design elements and text elements both with respect to one another and to predetermined positions in the visual design.

6. A method for generating a representation of a visual design according to claim 2 wherein the text elements include predetermined words, phrases and blocks of text.

7. A method for generating a representation of a visual design according to claim 1 wherein the representation comprises final artwork, reproduction material or specification drawings.

8. A method for generating a representation of a visual design according to claim wherein the visual design elements include logos, logotypes, graphics or other images, and wording in predetermined fonts.

9. A method for generating a representation of a visual design according to claim 1 wherein the predetermined visual design application include stationery, livery, signage, packaging, promotions and advertising applications.

10. A method for generating a representation of a visual design according to claim 1 wherein each of the plurality of predetermined visual design applications has its own predetermined design parameters which are related to the predetermined design parameters of one or more of the other visual design applications.

11. A method for generating a representation of a visual design according to claim including generating a display of the visual design on a video display unit or another display for viewing.

12. A method for generating a representation of a visual design according to claim 1 including storing a plurality of artwork elements, and reducing the visual design to a suitable hard-copy form, by relating the visual design to the stored artwork elements, thereby to generate artwork corresponding to the visual design.

13. A method for generating a representation of a visual design according to claim 12 wherein the artwork is generated in the form of a printed image or is stored on a computer disc.

14. A method of generating a representation of a visual design comprising:

storing data defining a plurality of visual design elements;

storing data defining a plurality of predetermined design parameters;

selecting one of a plurality of predetermined visual design applications, wherein each one of said plurality of predetermined visual design applications is associated with one or more of said plurality of predetermined design parameters;

selecting at least one of said plurality of visual design elements for inclusion in the visual design;

generating a visual design utilizing the selected visual design element, the size and of each visual design element being adjusted relative to the visual design based on the selected design application; and generating a representation of the visual design.

15. A method of generating a representation of a visual design according to claim 14 including storing data defining a plurality of text elements, and generating the visual design utilizing at least one selected text element, the juxtaposition of the elements being determined by the stored data relating to the predetermined design parameters.

16. A method of generating a representation of a visual design according to claim 15 wherein the predetermined design parameters include an intended viewing distance for the visual design, and the relative size and spacing of respective visual design elements and text elements, both with respect to one another and to predetermined positions in the visual design.

17. A method of generating a representation of a visual design according to claim 15 including entering data corresponding to a permitted range of variables in the selected design application, and adjusting at least one of the size and position of the selected elements in response to the entered data.

18. A method of generating a representation of a visual design according to claim 17 wherein the entered data corresponding to the permitted range of variables in the selected design application includes the intended viewing distance or the relative size and spacing of respective visual design elements and text elements both with respect to one another and to predetermined positions in the visual design.

19. A method of generating a representation of a visual design according to claim 14 wherein each of the plurality of predetermined visual design applications has its own predetermined design parameters, which are related to the predetermined design parameters of one or more of the other visual design applications.

20. A method of generating a representation of a visual design according to claim 14 including storing a plurality of artwork elements, and reducing the visual design to a suitable hard-copy form, by relating the visual design to the stored artwork elements, thereby to generate artwork corresponding to the visual design.

\* \* \* \* \*

UNITED STATES PATENT AND TRADEMARK OFFICE
CERTIFICATE OF CORRECTION

PATENT NO. : 5,535,320
DATED : July 9, 1996
INVENTOR(S) : Gay, et al

Page 1 of 2

It is certified that error appears in the above-indentified patent and that said Letters Patent is hereby corrected as shown below:

Column 4, Claim 2, line 1, change "for" to --of--; and
Column 5, line 4, after "to" insert --the predetermined design parameters.--

Column 5,
    Claim 3, line 1, change "for" to --of--.

Claim 4, line 1, change "for" to --of--.

Claim 5, line 1, change "for" to --of--.

Claim 6, line 1, change "for" to --of--; and

Claim 7, line 1, change "for" to --of--, and change "representation comprises final artwork, reproduction material or specification drawings" to --visual design elements include logos, logotypes, graphics or other images, and wording in predetermined fonts--.

Claim 8, line 1, change "for" to --of--;

UNITED STATES PATENT AND TRADEMARK OFFICE
CERTIFICATE OF CORRECTION

PATENT NO.  : 5,535,320
DATED       : July 9, 1996
INVENTOR(S) : Gay, et al

It is certified that error appears in the above-indentified patent and that said Letters Patent is hereby corrected as shown below:

Column 5:

Claim 9, line 1, change "for" to --of--; and
      line 3, change "application" to --applications--.

Claim 10, line 1, change "for" to --of--; and
      line 4, change "parameters" to --parameters,--.

Claim 11, line 1, change "for" to --of--; and
      line 2, after "claim" insert --1--.

Claim 12, line 1, change "for" to --of--.

Claim 13, line 1, change "for" to --of--.

Signed and Sealed this

Third Day of December, 1996

Attest:

BRUCE LEHMAN

*Attesting Officer*      *Commissioner of Patents and Trademarks*